(12) United States Patent
Hammer et al.

(10) Patent No.: US 7,523,818 B2
(45) Date of Patent: Apr. 28, 2009

(54) VIBRATION DAMPER WITH AMPLITUDE-SELECTIVE DAMPING FORCE

(75) Inventors: Thomas Hammer, Bischofsheim (DE);
Michael Doppernas, Trunstadt (DE);
Matthias Planitzer, Röthlein (DE);
Manfred Denner, Maßbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 106 days.

(21) Appl. No.: 11/296,078

(22) Filed: Dec. 7, 2005

(65) Prior Publication Data

US 2006/0118372 A1 Jun. 8, 2006

(30) Foreign Application Priority Data

Dec. 8, 2004 (DE) .................. 10 2004 058 965

(51) Int. Cl.
*F16F 9/34* (2006.01)
*F16J 1/00* (2006.01)
(52) U.S. Cl. .................. 188/322.15; 188/281; 188/284; 92/172; 92/167; 92/168
(58) Field of Classification Search ............ 188/322.15, 188/281, 284; 92/172, 167, 168
See application file for complete search history.

(56) References Cited

U.S. PATENT DOCUMENTS

| | | | | |
|---|---|---|---|---|
| 4,558,767 A | * | 12/1985 | Taylor ..................... | 188/282.1 |
| 4,588,053 A | * | 5/1986 | Foster ....................... | 188/275 |
| 4,907,680 A | * | 3/1990 | Wolfe et al. .............. | 188/266.5 |
| 5,018,608 A | * | 5/1991 | Imaizumi ................ | 188/322.15 |
| 5,249,652 A | * | 10/1993 | Leitzman et al. ........... | 188/281 |
| 5,799,759 A | * | 9/1998 | Koch .......................... | 188/300 |
| 5,823,306 A | | 10/1998 | de Molina | |
| 6,267,380 B1 | * | 7/2001 | Feistel ......................... | 277/309 |
| 6,352,145 B1 | * | 3/2002 | DeMolina et al. ........... | 188/281 |

(Continued)

FOREIGN PATENT DOCUMENTS

DE 42 27 554 2/1994

(Continued)

OTHER PUBLICATIONS

Search Report dated Apr. 5, 2006 issued for the corresponding European Application No. 05 026 297.1-2424.

*Primary Examiner*—Robert A Siconolfi
*Assistant Examiner*—Mahbubur Rashid
(74) *Attorney, Agent, or Firm*—Cohen Pontani Lieberman & Pavane LLP

(57) ABSTRACT

A vibration damper with amplitude-selective damping force includes a cylinder containing a damping medium, a piston rod which is axially movable in the cylinder, and a piston assembly arranged for axial movement in the damping medium, the piston assembly being connected to the piston rod and dividing the cylinder into a working space around the piston rod and a working space opposite the piston rod, the piston assembly includes a piston body having connecting channels for opposite directions of flow between the working spaces, and valve disks which open the channels in respective opposite directions. A pilot assembly includes an axially movable shifting ring which controls a flow connection between the working spaces as a function of movement of the piston rod, and a pair of stop surfaces which limit axial movement of the shifting ring, wherein the stop surfaces are independent of the piston body and the valve disks.

35 Claims, 15 Drawing Sheets

U.S. PATENT DOCUMENTS

2005/0034944 A1* 2/2005 Grundei ................. 188/316

FOREIGN PATENT DOCUMENTS

| DE | 44 27 273 | 2/1994 |
| --- | --- | --- |
| DE | 44 27 273 | 2/1995 |
| DE | 197 49 356 | 6/1998 |
| DE | 197 38 617 | 3/1999 |
| DE | 199 48 328 | 4/2000 |
| EP | 0 848 182 | 6/1988 |
| GB | 714180 | 8/1954 |
| GB | 2 328 999 | 3/1999 |

* cited by examiner

VIBRATION DAMPER WITH AMPLITUDE-SELECTIVE DAMPING FORCE

BACKGROUND OF THE INVENTION

1. Field of the Invention

The invention pertains to a vibration damper with amplitude-selective damping force which includes a cylinder containing a damping medium, a piston rod which is axially movable in the cylinder, and a piston assembly arranged for axial movement in the damping medium, the piston assembly being connected to the piston rod and dividing the cylinder into a working space around the piston rod and a working space opposite the piston rod. The piston assembly includes a piston body having connecting channels for opposite directions of flow between the working spaces, and valve disks which open the channels in respective opposite directions. A pilot assembly includes an axially movable shifting ring which controls a flow connection between the working spaces as a function of movement of the piston rod.

2. Description of the Related Art

A vibration damper with amplitude-selective or stroke dependent damping force is known from U.S. Pat. No. 5,823,306. In the first design variant of this damper, a piston arrangement is provided, which comprises a lower and an upper valve, which are kept a certain distance apart by a spacer. The two sides of each of the two valves is equipped with damping valve disks and at least one nonreturn valve disk. A shifting ring, which is free to move axially back and forth, is installed between the two valves; depending on the direction in which the piston rod is moving, this ring comes to rest against one or the other of the two facing valve disks of the two valves and thus releases or blocks an annular gap between the valve disks and the inside wall of the cylinder. Each of the two valves is provided with a pilot cross section in the area of the nonreturn valve disk and another in the area of the damping valve disk; damping medium flows through these pilot cross sections at a rate which is a function of the position reached by the axially movable shifting ring. In the let-through position of the axially movable shifting ring, the throttling effects of the pilot cross sections in the valve disks are superimposed on each other and thus determine the damping force. This valve design seems comparatively complicated and expensive as a result of the large number of valve disks which are used. In addition, the manufacturing tolerances of the two pilot cross sections, which act in parallel, can have a negative effect on their functionality. The two valves, furthermore, must be equipped with piston rings; although these do not appear in the drawing, the expert knows that it is necessary to provide them, because the annular gap between the inside wall of the cylinder and the valve is considerably larger than the pilot cross section. Two piston rings not only represent a cost problem but can also cause undesirable variations in the damping force.

FIGS. 7-10 of U.S. Pat. No. 5,823,306 pertain to a variant in which the shifting ring is free to move between the top surface of a valve disk and a cup-shaped housing, which is clamped between a spring catch and the piston rod. In this variant, there are again two pilot cross sections, which go into effect when the axially movable ring is in the let-through position.

GB 2 328 999 describes an amplitude-selective vibration damper with a piston ring which is designed with freedom of axial movement in a groove in the piston. The disadvantage of this solution is that an individually dimensioned piston must be used for each damping force characteristic within the range of the amplitude-dependent damping force.

SUMMARY OF THE INVENTION

The task of the present invention is to realize a vibration damper with amplitude-selective damping force which uses as many standardizable components as possible and which can be used for as many different damping force characteristics as possible.

According to the invention, the two stop surfaces are provided by an assembly which is independent of both the piston body and the valve disks.

The great advantage of the invention is that a standard piston body and a standard set of valve disks can be used. This offers a considerable cost advantage, because not only many of the essential parts but also the assembly jigs can be standard items. The independent assembly is a simple additional part, which can be selected and incorporated as a function of the specific design of the vibration damper.

In another advantageous embodiment, the assembly has a sleeve-like base body. Thus the available space is efficiently utilized, and in addition the fabrication jigs already available for piston bodies, for example, can be used for the machining operations.

The sleeve-like base body has ring-shaped webs, on which the stop surfaces for the shifting ring are provided. The shifting ring can move axially between the ring-shaped webs, and as a result the radial guidance of the shifting ring is much better than that offered by the solutions according to the state of the art.

It is provided that the assembly is supported axially against the piston body. Thus a compact design in the axial direction is obtained, which has hardly any negative effect on the usable length of the stroke of the piston.

In addition, the piston body has a centering device for the assembly. When mounted on the piston body, the assembly will thus assume its optimal position. This also means that it will be impossible for any clamping effects to occur between the assembly and inside wall of the cylinder.

According to an advantageous subclaim, the sleeve-like base body consists of several parts, where the joint line is located axially between the stop surfaces. A base body of this type can be manufactured very easily by the sintering technique because of the ease with which the parts can be removed from the mold. The joint line for one of the subsections can even be located in the area of a stop surface.

So that the base body can be installed easily even though it consists of several parts, a first subsection of the sleeve-like base body axially overlaps a second subsection and is connected to it by a press-fit.

To avoid leaks inside the piston arrangement which could negatively effect the damping force characteristic, the assembly is sealed off against the piston body by at least one seal.

So that the piston can be guided with optimal effectiveness, the piston body should have a certain minimum length, and the annular gap between the piston body and the inside wall of the cylinder should be as small as possible. This is especially true for a piston body which must also transmit transverse forces in the vibration damper as in the case of a damper in the form of a MacPherson strut unit. The narrow annular gap through which the damping medium flows to the connection proceeding toward the shifting ring has a considerable effect on the damping force characteristic of the piston arrangement. This effect varies, however, with the temperature of the damping medium. For this reason, the lateral surface of the piston body is provided with at least one axial groove, which leads to the flow connection between the two working spaces. One axial groove does not measurably impair the effectiveness with which the piston arrangement is guided, but it is enough to compensate for the changes in the viscosity of the damping medium, which are thus no longer able to cause any change in the damping force.

When the shifting ring occupies an intermediate position between the stop surfaces, there should still be a certain throttle cross section in effect; although this cross section produces only a small damping force, the force which is does produce is defined. To satisfy this requirement, the piston arrangement is also provided with a throttle ring, which determines at least one first pilot cross section. Although it is possible in principle to omit the throttle ring, the desired damping force characteristic is easier to reproduce if such a ring is provided. Alternatively, it is the assembly which is provided with the throttle ring which determines at least one first pilot cross section.

In an elaboration of the invention, the throttle ring is designed with freedom of axial movement within certain limits and determines one or another of two pilot cross sections of different sizes, depending on the direction in which the throttle ring moves. Thus, for example, a larger damping force can be produced when the piston rod or throttle ring is traveling outward than when the piston rod is traveling inward.

The throttle ring is designed with the freedom to move axially in a throttle ring groove in the assembly. It thus represents a separate part which can be installed together with the assembly, independently of the other components of the piston arrangement.

The shifting ring determines a pilot cross section supplemental to that determined by the throttle ring. This supplemental cross section goes into effect when the shifting ring makes contact with one of the stop surfaces. When the stroke of the piston rod exceeds a certain length, the pilot cross section of the throttle ring is not simply blocked, nor is the piston arrangement or a second flow route hermetically sealed or closed; on the contrary, a pilot cross section which goes into effect under these conditions is determined by the shifting ring.

The pilot cross section which is determined by the throttle ring is larger than the pilot cross section which goes into effect upon contact of the shifting ring with a stop surface. As a result of this feature, the damping force adjustment obtained when the shifting ring is not resting against either one of the stop surfaces and thus is not exerting any effect is especially favorable to a comfortable ride.

The pilot cross sections can be designed in a wide variety of ways. For example, the pilot cross sections can be provided in the throttle ring and/or in the shifting ring. This option is especially advisable when the throttle or shifting ring is produced by primary forming.

The pilot cross sections can also be designed in the form of diameter reductions, grooves, or recesses in the outside diameter. This method is also easy to realize by machining.

Alternatively, the pilot cross sections can be formed as recesses in the stop surfaces.

To protect the shifting ring against wear at the time of contact, the ring can be enclosed in a carrier ring, which comes to rest against the stop surfaces.

The sleeve-like base body is preferably fixed in place on the piston rod by a retaining disk. So that the damping valve function of the piston arrangement is not impeded, the retaining disk is provided with at least one through-opening for the damping medium.

The retaining disk can be designed as an integral part of the sleeve-like base body. This variant is especially sturdy and also very easy to manage.

The inventive assembly can be held together separately from the clamped-together components of the piston arrangement, which is held together by a piston nut. This design means that the piston arrangement is a completely independent unit and can be assembled separately. In the first step, a conventional piston damping valve is mounted on, and fastened to, the piston rod. In the second step, the assembly is installed. This embodiment is especially effective in the case of damping valves which must be tested for functional accuracy during the assembling operations.

In principle, the assembly can be held in place by the piston nut, or a separate fastening nut just for the assembly can be used. Especially in the case of very short piston rod threads, it is advisable for the retaining disk of the assembly to be screwed onto the piston rod, so that a separate fastening nut can be omitted.

According to an advantageous embodiment, at least one pilot cross section for the throttle ring is formed by a washer. This measure offers the advantages that a very simple cross section can be provided for the throttle ring and that there is no need to stamp a groove into the throttle ring. In addition, such washers are very simple parts, which can be fabricated with great precision.

At least one pilot cross section for the shifting ring can also be formed by a washer.

To minimize the number of parts within the assembly, a pilot cross section for the throttle ring and a pilot cross section for the shifting ring can be formed by an intermediate ring.

The washers should always assume a defined installation position. For this reason, the minimum of one washer is clamped between the two axial parts of the sleeve-like base body. The base body and the retaining disk are two separate components.

It is also possible for a clamping sleeve to hold the minimum of one washer in a position which is concentric to the sleeve-like base body.

Under certain conditions, the shifting ring can arrive at its end position at high speed. This can generate noise, which can be damped by at least one spring element.

The spring element should be designed to occupy as little space as possible, so that the assembly, especially the sleeve-like base body, will be compact in the axial direction. For this reason, the spring element is formed by a spring washer.

In an advantageous embodiment, the spring washer is provided with at least one cutout which is larger than the pilot cross section controlled by the shifting ring. The goal is to prevent the spring washer from determining the effective pilot cross section.

In one embodiment, the retaining disk is provided with a fastening flange for the sleeve-like base body. This design principle facilitates the use of a clamping sleeve on the sleeve-like base body.

A threaded connection can be provided between the fastening flange and the sleeve-like base body.

A defined pilot cross section is specified for almost every type of vibration damper. A pilot cross sections is, in principle, comparatively small and must therefore be made very precisely. Manufacturing tolerances have the effect of changing the damping force characteristic of the vibration damper. A pilot cross section which cooperates with the throttle ring and is also adjustable can correct for these tolerances or can be used with identical components to realize different pilot cross sections. The pilot cross section is formed by two components which are adjustable with respect to each other. One component is formed by the piston body, the other by the assembly.

The throttle ring groove has a control opening, which can be covered by a control slide to form the adjustable pilot cross section. The pilot cross section can be determined by displacing the control opening with respect to the control slide.

So that the pilot cross section can be controlled as effectively as possible, there should be only a single flow route for the damping medium through the pilot cross section. For this reason, the control slide has a pocket, which is connected to the flow connection leading to the shifting ring. The pilot cross section on the throttle ring and the effective pilot cross section on the shifting ring are connected functionally in series with each other.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
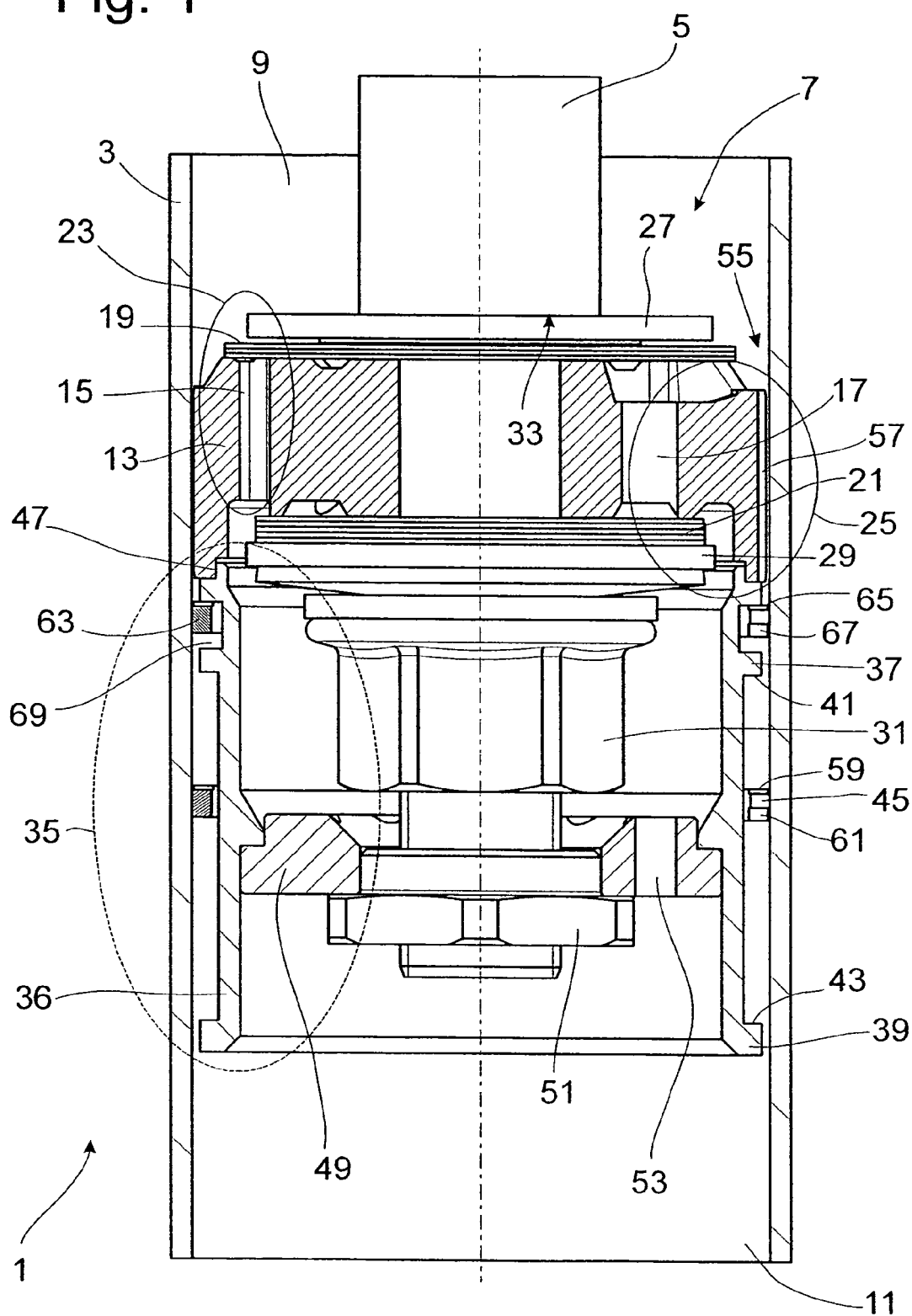
FIGS. 1-4 show sections of a vibration damper with the shifting ring in various positions.
Figure 2:
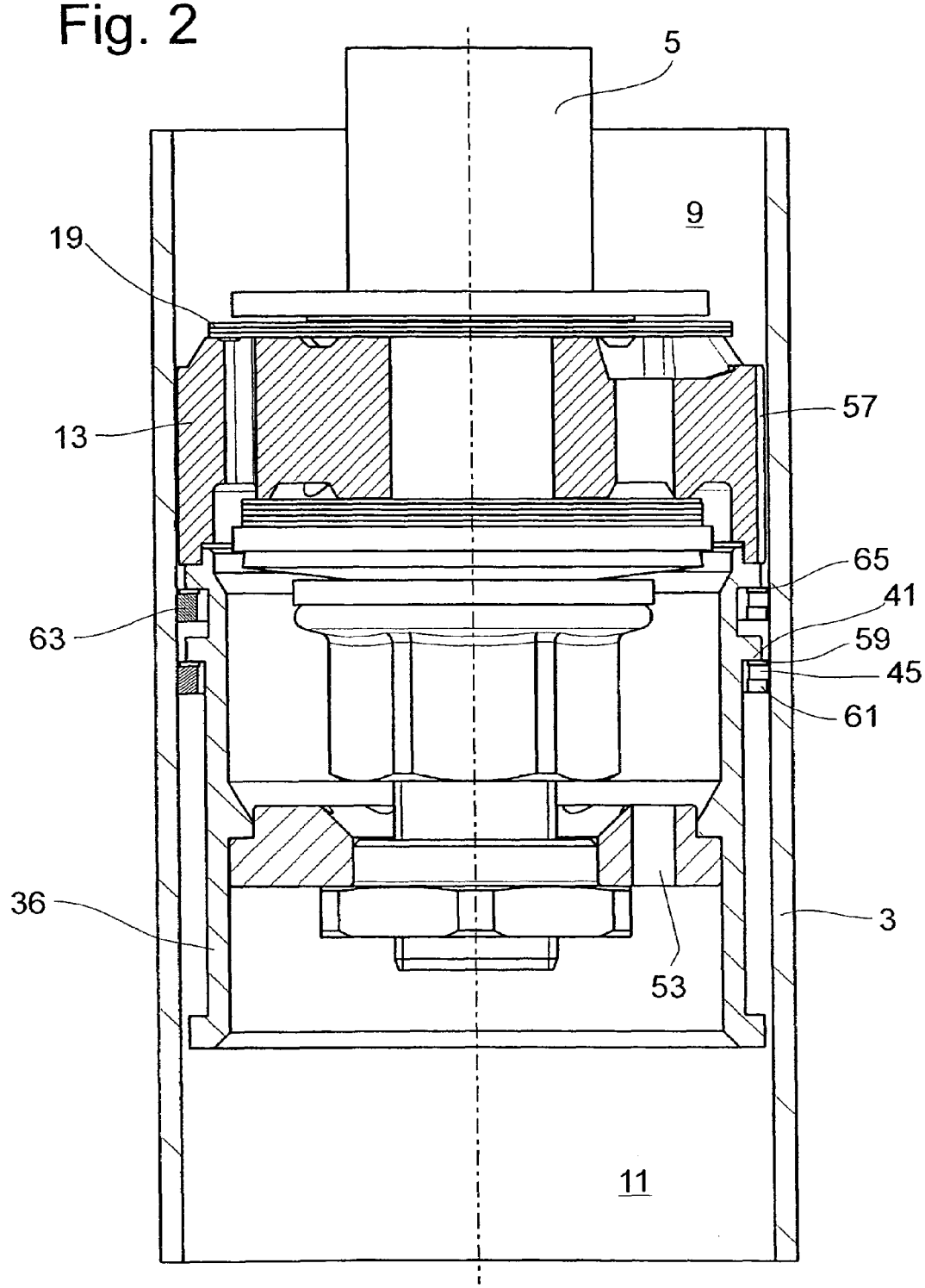

FIG. 1 shows a part of a vibration damper 1 of arbitrary design. A piston rod 5 and its piston 7 are guided with freedom of axial movement in a cylinder 3. The piston arrangement divides the damping medium-filled cylinder 3 into a working space 9 on the side where the piston rod is located and a working space 11 on the side opposite the piston rod. The main component of the piston arrangement is the piston body 13, which contains connecting channels 15, 17 equipped with valve disks 19, 21 for both directions of flow. The connecting channels 15 and the valve disks 19 form a compression stage valve 23, which generates a damping force when the piston rod travels inward. The tension stage valve 25, which acts in the outward travel direction of the piston rod, consists of the connecting channels 17 and the valve disks 21. The valve disks are pretensioned onto the piston body and release the outlets of the connecting channels when a certain opening pressure acting on the valve disks is present in the connecting channels. Adjacent to the valve disks 19, 21 are the support disks 27, 29, which support the valve disks. The package between the support disks is pretensioned onto a shoulder 33 of the piston rod 5 by a piston nut 31.

The piston arrangement 7 includes a pilot assembly 35, which is independent of the piston body and of the valve disks. The pilot assembly 35 has a sleeve-like base body 36, which has ring-shaped webs 37, 39, on which facing stop surfaces 41, 43 for an axially movable shifting ring 45 are provided. In the working space 11 opposite the piston rod, the assembly 35 is supported axially against the piston body 13, which also has a centering device 47 for the assembly. The entire assembly 35 is held in place on the piston rod 5 by a retaining disk 49. In the exemplary embodiment, the sleeve-like base body 36 is a one-piece unit. A centering nut 51 pretensions the assembly via the retaining disk 49 onto the piston body 13, this nut being independent of the piston nut 31, which holds the set of clamped-together parts of the piston arrangement located between the two support disks 27, 29. The retaining disk is provided with at least one through-opening 53 for damping medium to ensure that the medium can flow unhindered both to and from the damping valves 23, 25.

The shifting ring 45 is pretensioned radially against the inside wall of the cylinder 3, so that a frictional force is present. Between the radially inward side of the ring and the sleeve-like base body there is an annular gap, which controls a flow connection 55 between the two working spaces 9, 11. The flow connection 55 continues along the area of the lateral surface of the piston body. For this purpose the piston body 13 has at least one axial groove 57, e.g., in the form of a flattened surface. As can be seen in FIGS. 10-13, pilot cross sections 59, 61 in the form of recesses are provided in the top and bottom surfaces of the shifting ring. The pilot cross sections can be of different sizes. To guarantee that the slotted shifting ring 45 will be installed in the correct position on the sleeve-like base body 36, the number of pilot cross sections on the one end surface of the shifting ring 59 is different than on the other end surface. The pilot cross sections 59, 61 of the shifting ring go into effect when the shifting ring 45 comes to rest against one of the stop surfaces 41, 43 of the ring-shaped webs 37, 39.

In addition to the shifting ring 45, the assembly also has a throttle ring 63, which also forms a part of the piston arrangement. This ring determines a first pilot cross section 65, 67. In this exemplary embodiment, the throttle ring 63 is designed with freedom of axial movement in a throttle ring groove 69 in the pilot assembly 35, so that one or the other of the two pilot cross sections 65, 67 will go into effect, depending on the direction in which the throttle ring moves.

For the sake of clarity, the throttle ring groove 69 appears wider in the figures than it actually is. The throttle ring 63 can move axially to only a very small extent between the sidewalls of the groove. The shifting distance should at least be long enough to ensure that the throttling action of the active pilot cross section is greater than the throttling action between the exposed end surface of the throttle ring and the opposed groove sidewall. In terms of its basic design, the throttle ring 63 is similar to the shifting ring 45, so that reference can be made again to FIGS. 10-13 to help clarify the explanation. The shifting ring determines an additional pilot cross section 59, 61, i.e., additional to the pilot cross section 65, 67 of the throttle ring. The pilot cross section 65, 67, which is determined by the throttle ring 63, is larger than the pilot cross section 59, 61, which goes into effect when the shifting ring 45 makes contact with the stop surface 41, 43.

FIGS. 1-4 are intended to illustrate how the vibration damper with amplitude-dependent damping force operates. In FIG. 1, the upper end surface of the throttle ring 63 rests against the sidewall of the throttle ring groove 69, so that the pilot cross section 65 is active. The shifting ring 45 is located a certain distance away from both stop surfaces 41, 43. Thus a comparatively large pilot cross section 65 is available, which ensures that, as the piston rod travels further inward over the course of a certain stroke range, i.e., until the shifting ring 45 comes to rest against the stop surface 41 (see FIG. 2), the valve disks 19 will not be lifted from the piston body 13. The further inward travel of the piston rod 5 is determined by the pilot cross section 59 of the shifting ring 45, which is smaller than the pilot cross section 65. When the piston rod is traveling slowly, the damping medium can flow from the working space 11 on the side opposite the piston rod into the gap between the sleeve-like base body 36 and the inside wall of the cylinder 3 and then proceed radially inward along the end surface of the shifting ring 45. It can then pass through the pilot cross section 59, the pilot cross section 65, and the annular gap between the upper boundary web of the throttle ring groove 69 and the cylinder wall, thus finally reaching the working space 9 on the side of the piston rod via the minimum of one axial groove 57. The damping medium will also be acting in parallel on the valve disks 19 via the damping medium through-openings 53 and the connecting channels 15. When the velocity of the piston rod exceeds a certain value, however, the valve disks 19 are lifted, that is, the compression stage valve 23 will be opened.

Figure 3:
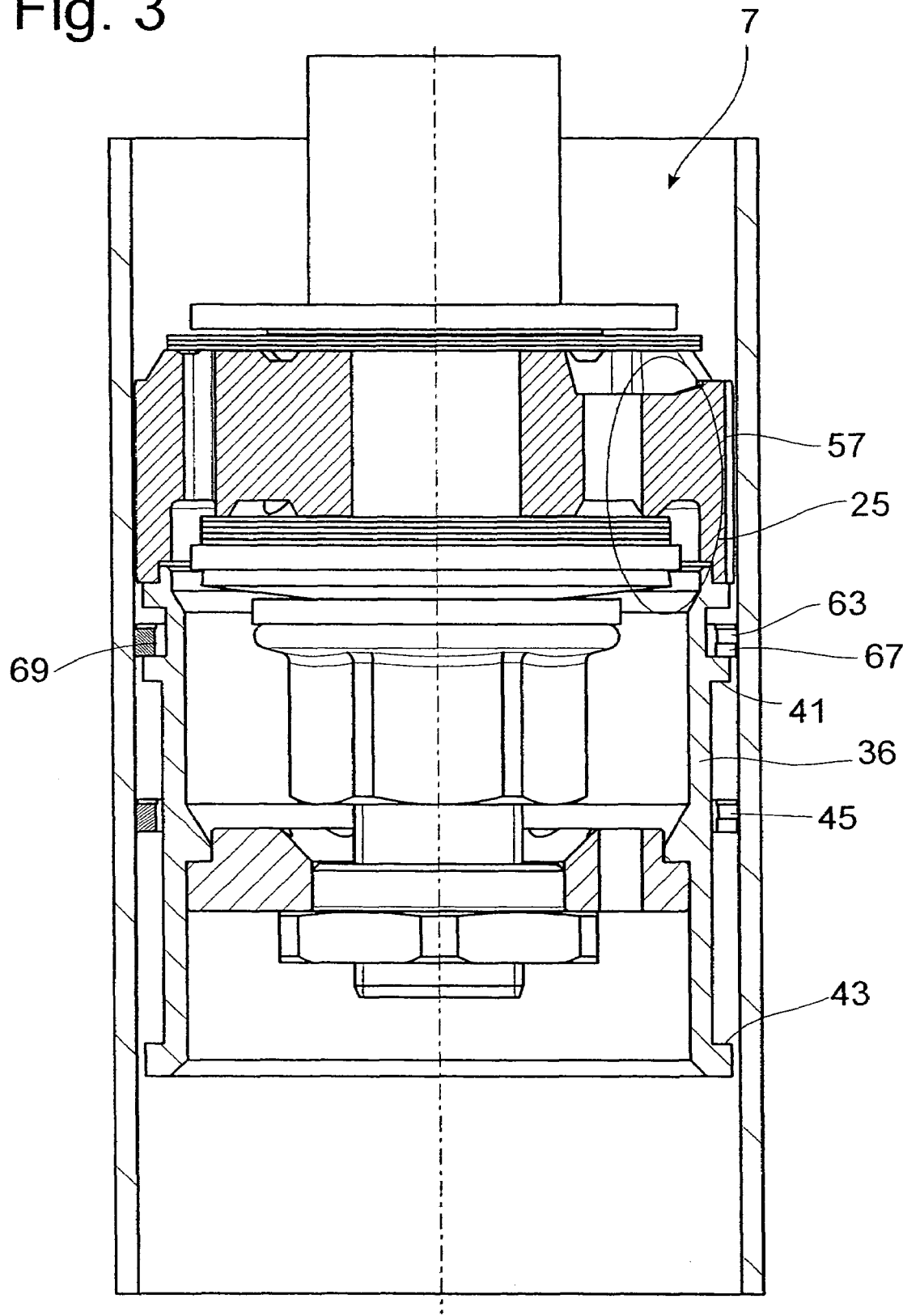

FIG. 3 shows the operating state which develops when the piston rod 5 is traveling outward and the bottom end surface of the throttle ring 63, which, like the shifting ring 45, is under radially outward-directed pretension and thus controlled by friction, comes to rest against the opposing sidewall of the throttle ring groove 69. As a result, the pilot cross section 67 goes into effect. In this state, the pilot cross section 61 of the shifting ring does not exert any effect, because the ring is a certain distance away from both stop surfaces 41, 43. The damping medium can now flow in the opposite direction via the minimum of one axial groove 57 into the throttle ring groove 69, pass through the pilot cross section 67, and reach the annular space between the sleeve-like base body 36 and the inside wall of the cylinder 3.

Figure 4:
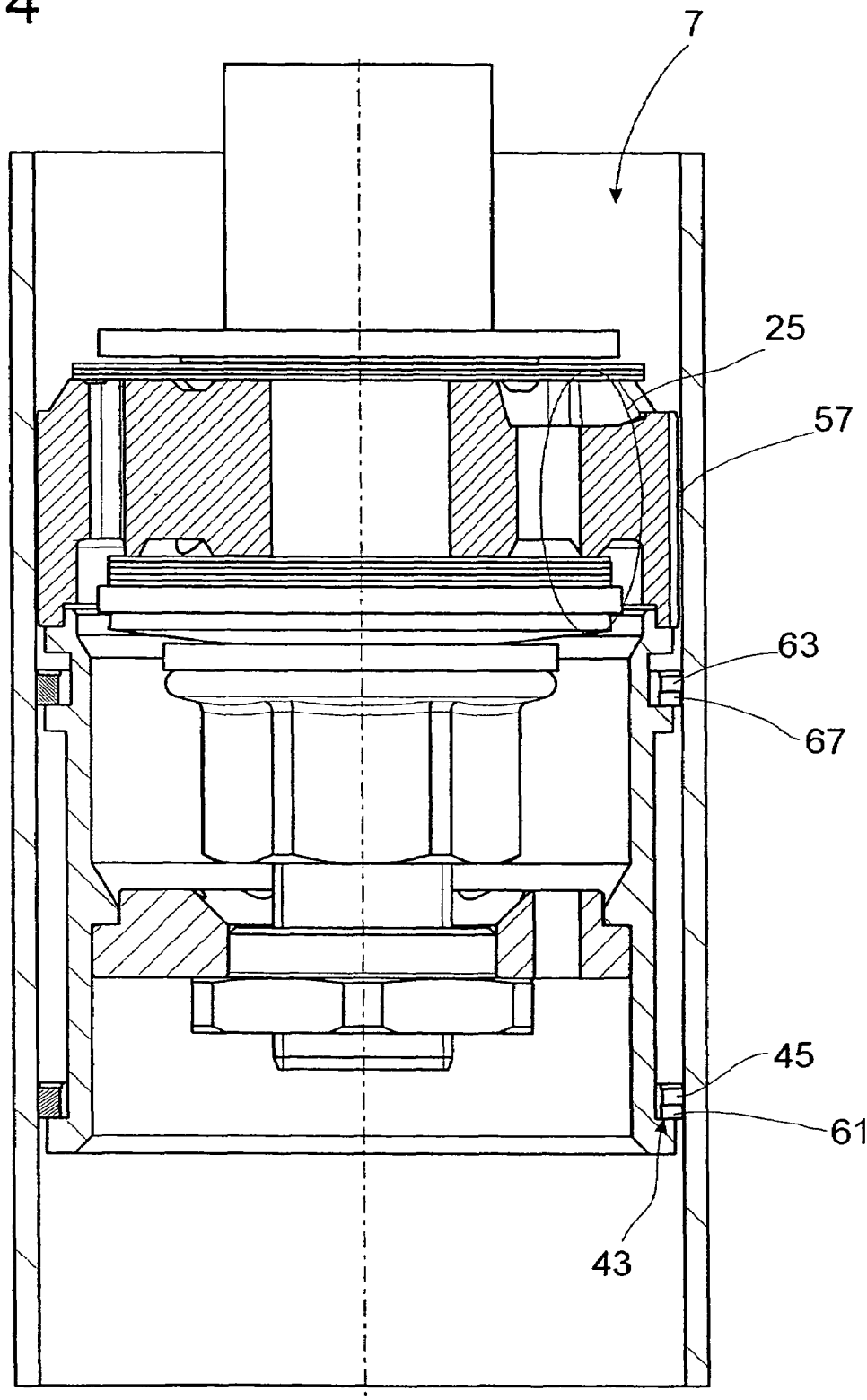

FIG. 4 shows the state which the piston arrangement 7 reaches after the piston rod has traveled farther outward and the shifting ring 45 has come to rest against the stop surface 43. The pilot cross section 61 thus now determines the damping force characteristic. Connected hydraulically in parallel is the tension stage valve 25. The distance between the two stop surfaces 41, 43 can also influence the damping force characteristic, especially in the range of slow piston velocities.

Figure 5:
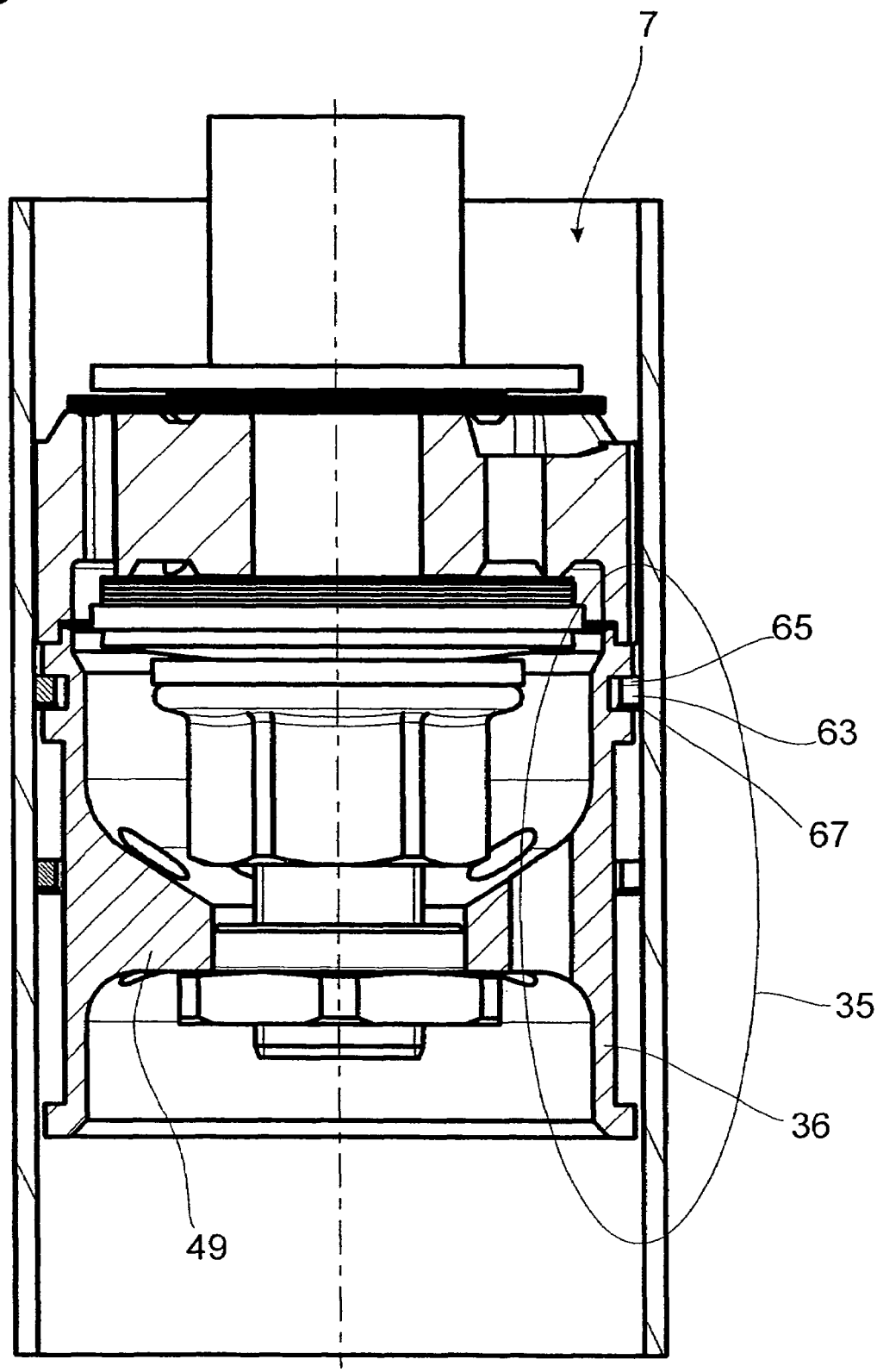
FIGS. 5 and 6 show the assembly with a one-piece retaining disk.

FIG. 5 shows a variant of a piston arrangement 7 which is simpler than that shown in FIGS. 1-4. One of the differences is that the throttle ring has no freedom of axial movement. This means that the same pilot cross sections 65, 67 are used for both directions of flow. Another essential difference is that the retaining disk 49 of the assembly 35 is designed as an integral part of the sleeve-like base body 36.

Figure 6:
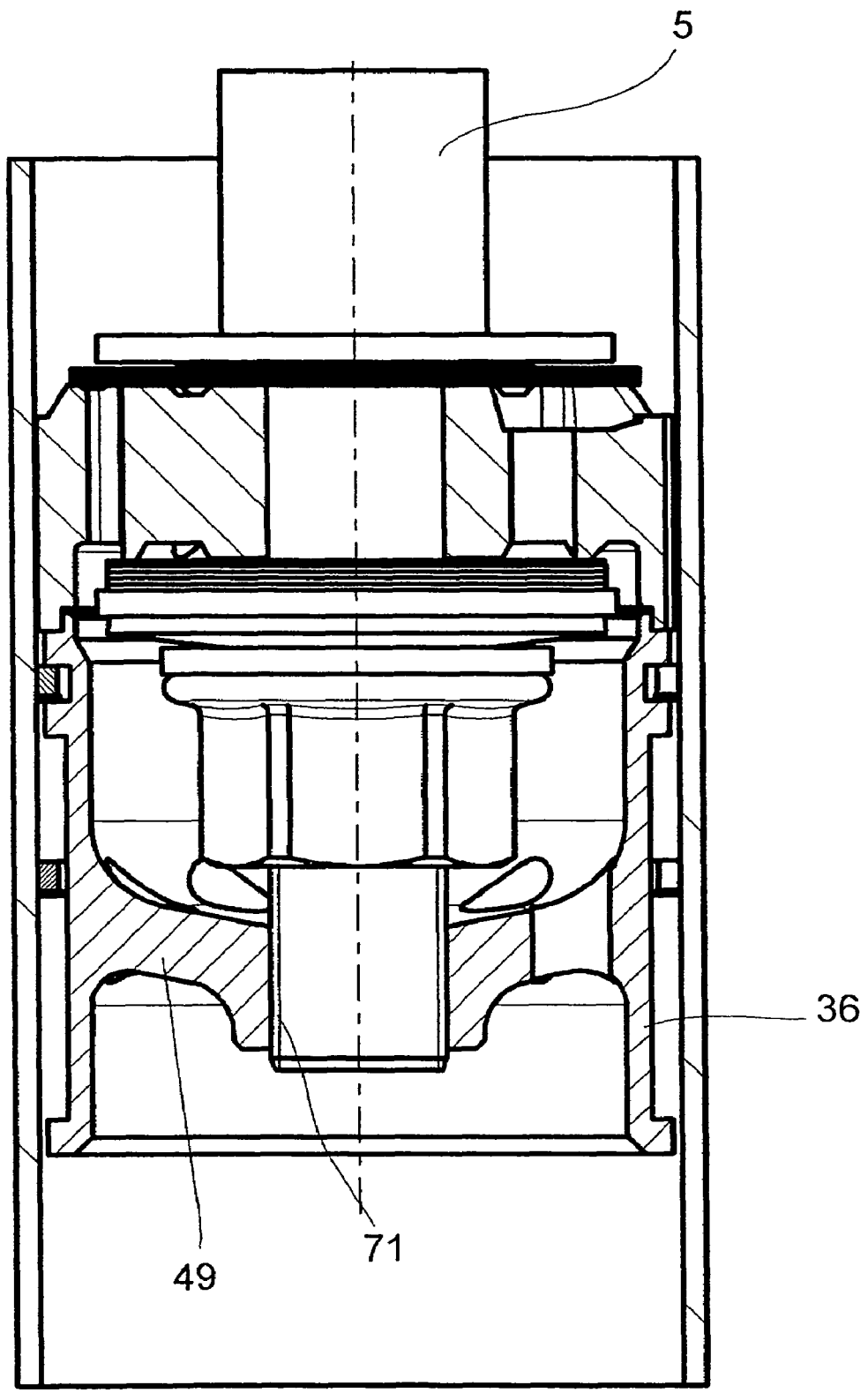

FIG. 6 shows a solution which is identical to that of FIG. 5 with respect to the integration of the retaining disk 49 into the sleeve-like base body 36. The difference is that the retaining disk is connected here directly to the piston rod 5 by means of a thread 71.

Figure 7:
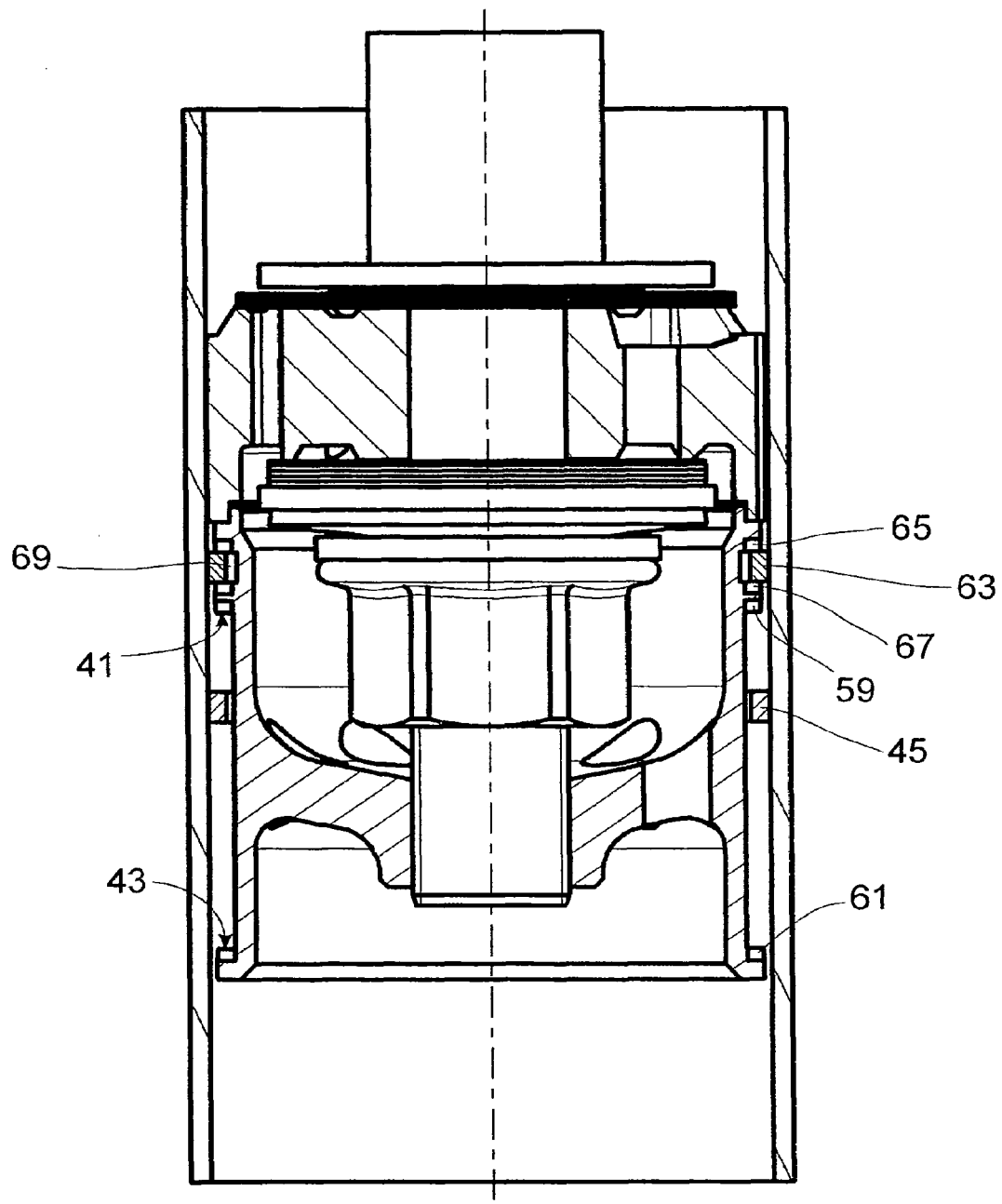
FIG. 7 shows the stop surfaces with pilot cross sections.

In the previous variants, the pilot cross sections 59, 61 are designed as recesses in the shifting ring 45 and the pilot cross sections 65, 67 are designed as recesses in the throttle ring 63. In FIG. 7, these pilot cross sections are designed as recesses machined into the associated stop surfaces 41, 43 and into the sidewalls of the throttle ring groove 69.

Figure 8:
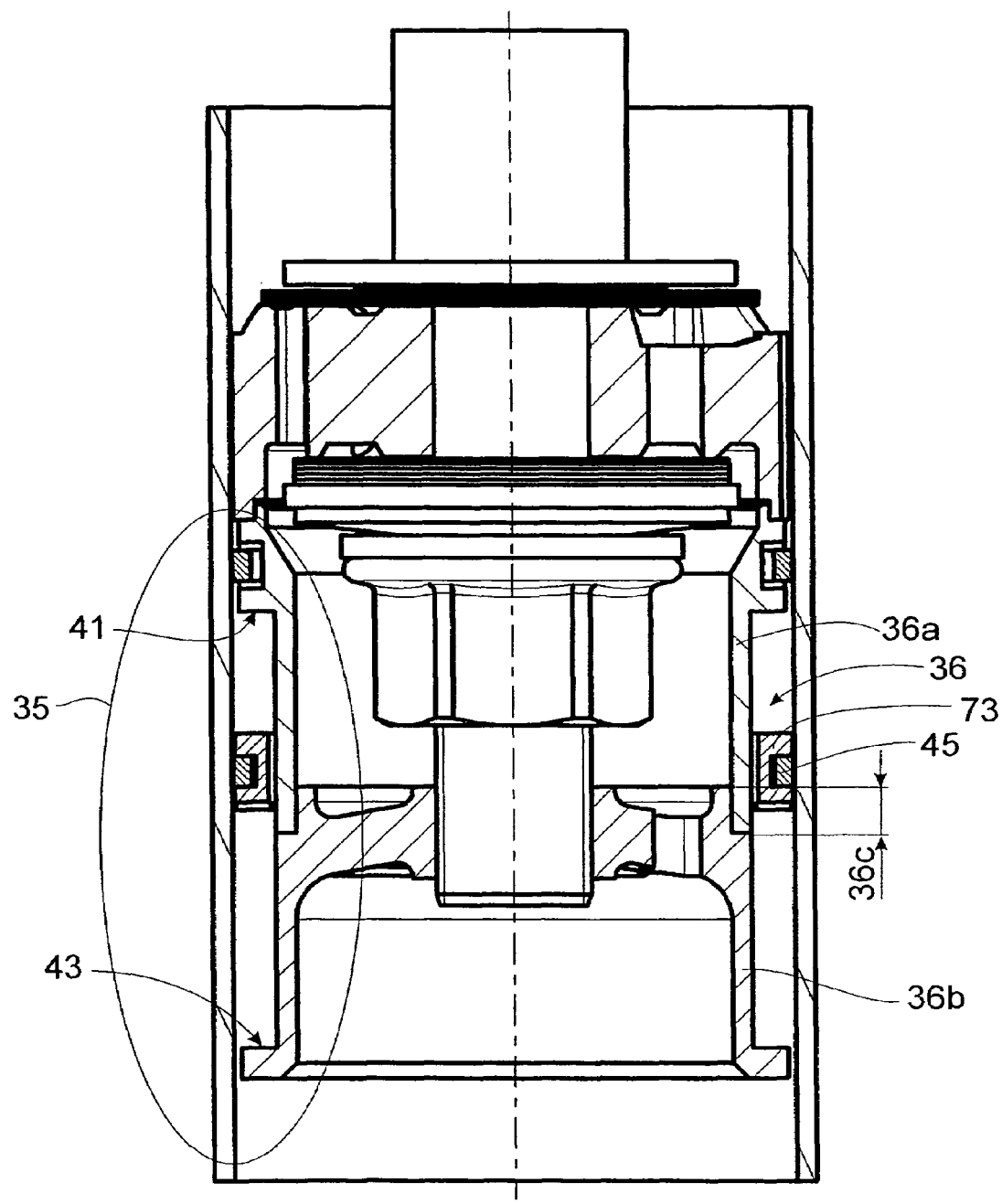
FIG. 8 shows the shifting ring enclosed in a carrier ring.

FIG. 8 discloses an inventive embodiment in which the sleeve-like base body 36 is made up of several parts, where the joint line is between the stop surfaces 41, 43. A first subsection 36a and a second subsection 36b form an axial overlap 36c. There is a press-fit between the two subsections in the area of the axial overlap, so that, despite the two-part design, a closed assembly 35 is present. The two-part design of the sleeve-like base body 36 promotes the use of an unslotted shifting ring 45. The shifting ring 45 is enclosed in a carrier ring 73, which comes to rest against the stop surfaces 41, 43. The pilot cross sections 59, 61 can also be provided in the carrier ring. The carrier ring 73 can be made of a material harder than that of the shifting ring 45, because the sealing function is performed by the shifting ring.

Figure 9:
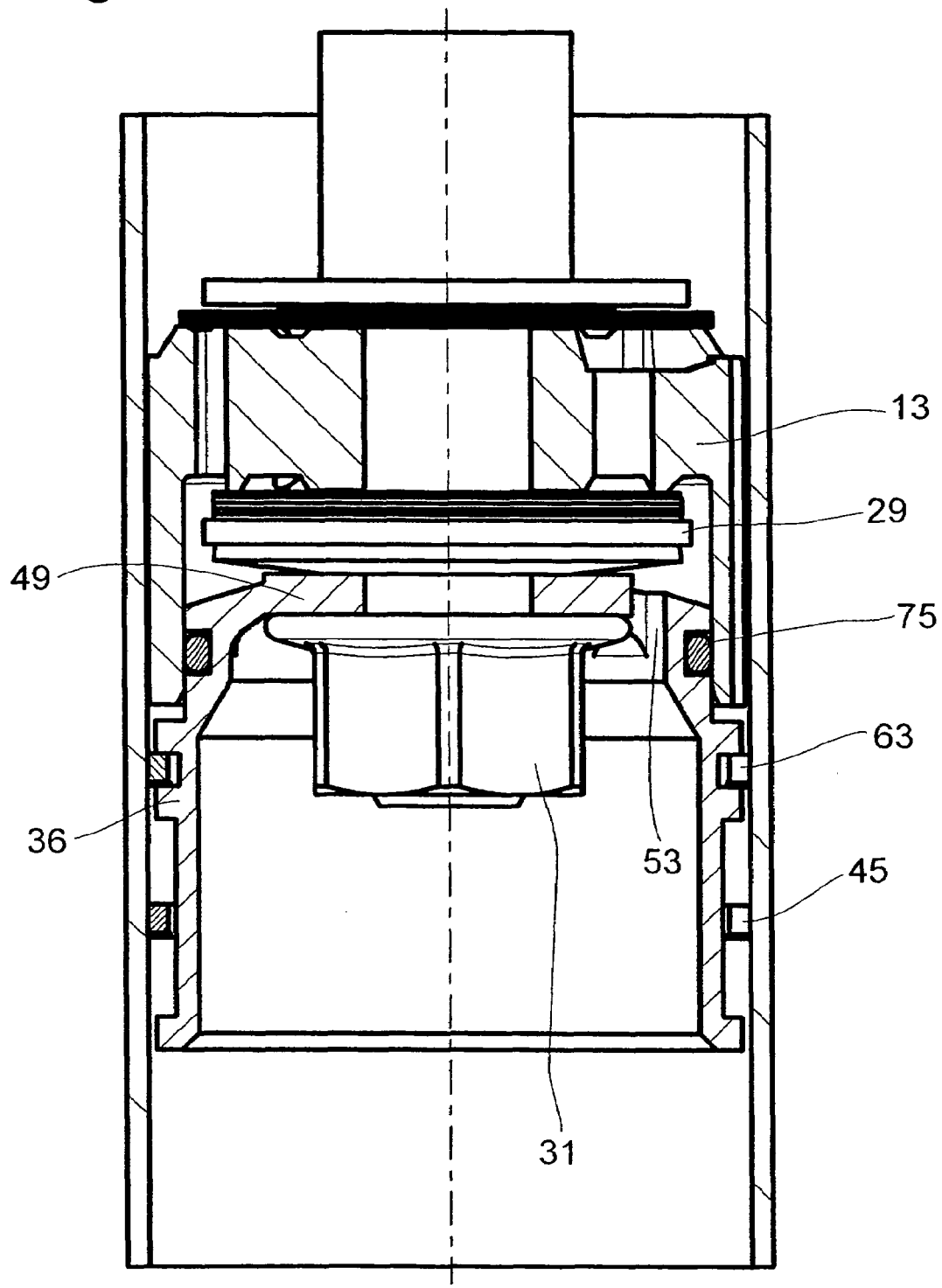
FIG. 9 shows an assembly fastened by a piston nut.
Figure 11:
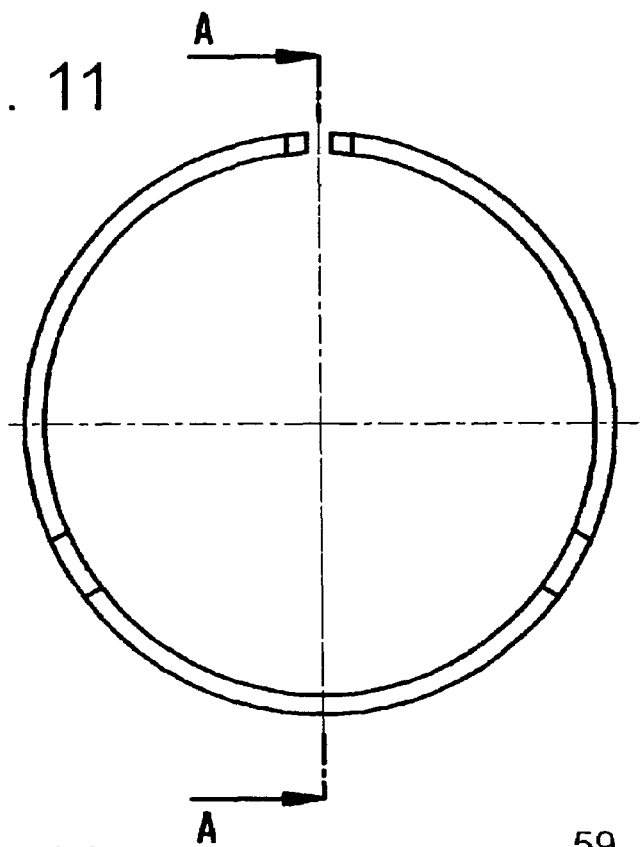
FIGS. 10-13 show shifting rings/throttle rings as individual parts.
Figure 12:
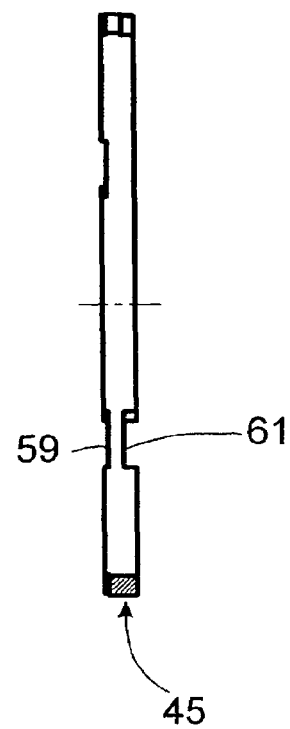
Figure 10:
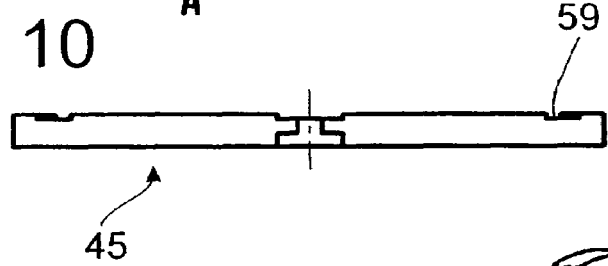
Figure 13:
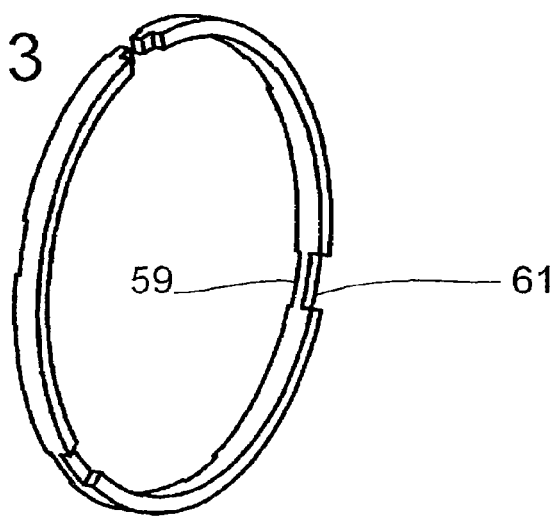

FIG. 9 shows another modification of the arrangement shown in the previous figures. One of the essential differences is that the retaining disk 49 of the sleeve-like base body 36 is pretensioned by the piston nut 31 directly onto the support disk 29 and thus directly onto the piston body 13. So that the damping medium is not hydraulically bridged via the damping medium through-openings 53, the shifting ring 45, and the throttle ring 63, which is a possibility especially during the outward travel of the piston rod, at least one seal 75 is installed between the sleeve-like base body 36 and the piston body 13.

Figure 14:
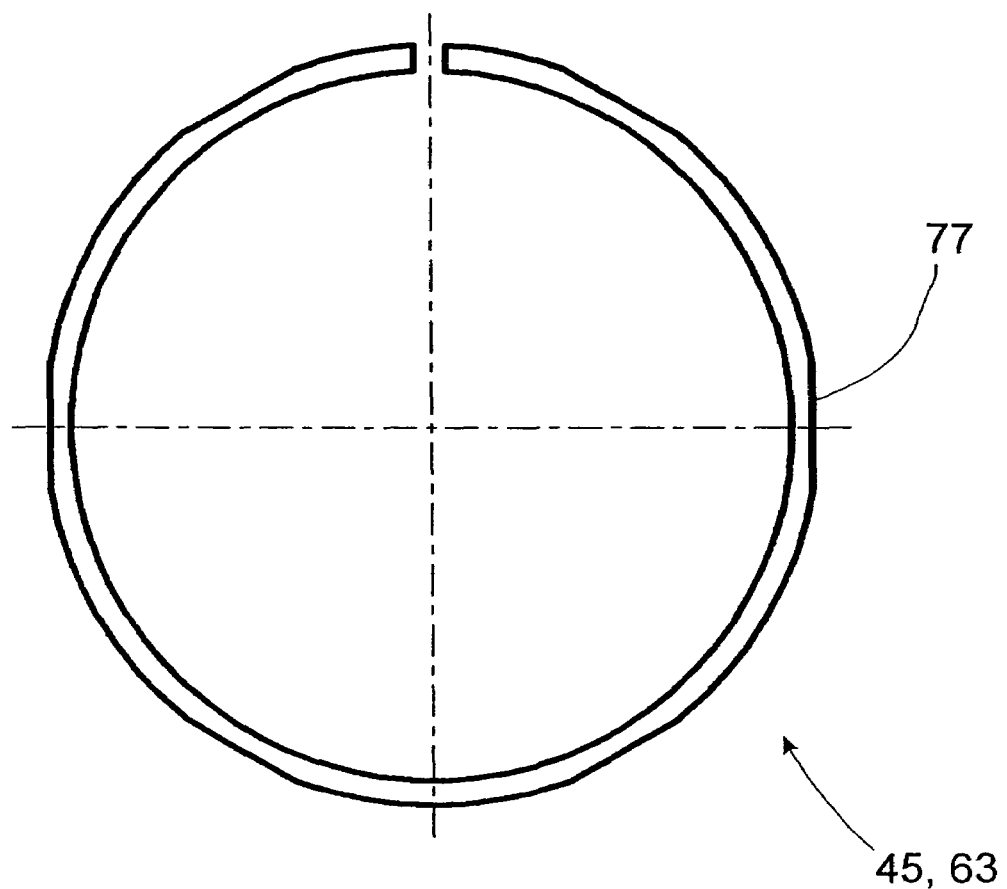
FIGS. 14 and 15 show shifting rings/throttle rings with diameter reductions as pilot cross sections.
Figure 15:
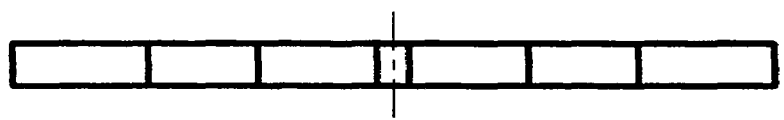

FIGS. 14 and 15 show a design for a throttle ring 63 or a shifting ring 45 which is simpler than that of the rings shown in FIGS. 10-13. The essential difference here is that the ring has diameter reductions 77 or possibly grooves on its outside diameter, which act as pilot cross sections together with the inside wall of the cylinder.

Figure 16:
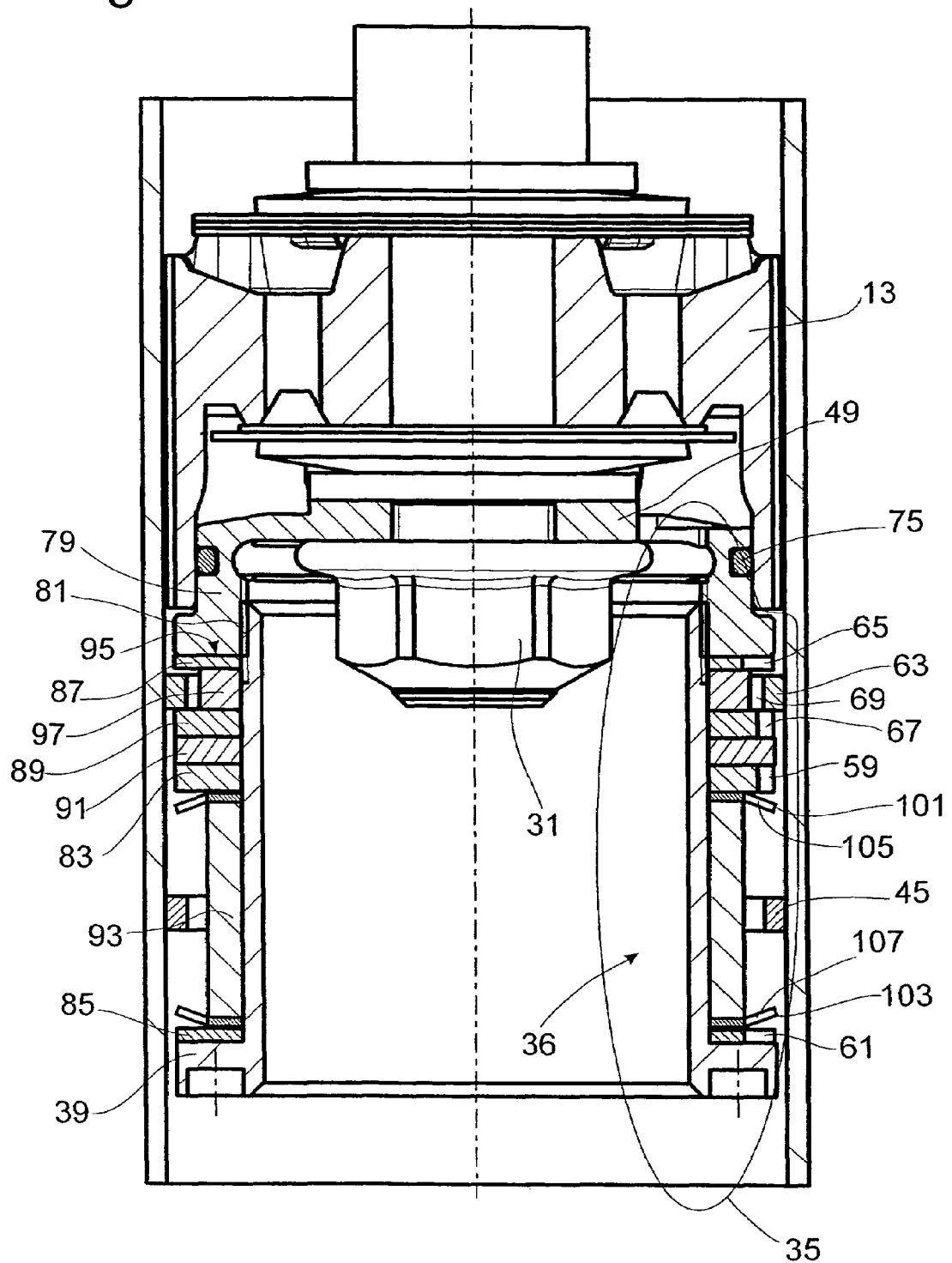
FIGS. 16 and 17 show pilot cross sections in the shifting ring.

FIG. 16 shows a modification of the design according to FIG. 9. The essential difference is that the throttle ring 63 is installed inside the pilot assembly 35 and not directly in the base body 36. In addition, the retaining disk 49 of the assembly 35 has a fastening flange 79 for the sleeve-like base body 36, where a threaded joint 81 is present between the fastening flange and the sleeve-shaped base body. Practically speaking, the base body thus consists of two separate parts. The seal 75 against the piston body is also installed in the fastening flange.

The pilot cross sections 65, 67 for the throttle ring 63 and the pilot cross sections 59, 61 which the shifting ring 45 controls are formed by washers 83, 85; 87, 89, each of which has appropriate openings in its outside diameter. A spacer ring 91 is also installed between the two adjacent washers 83, 89.

At least one washer is held in place by a clamping sleeve 93, which is concentric to the sleeve-like base body 36. The ring-shaped web 39 of the sleeve-like base body 36 cooperates with the end surface 95 of the retaining disk 49 to create a set of clamped-together components, where the length of the clamping sleeve 93 determines the maximum stroke of the shifting ring 45. During the assembly procedure, the washers 83, 85, 87, 89, the clamping sleeve 93, the spacer ring 91, and an intermediate ring 97 concentric to the throttle ring 63 are threaded onto the sleeve-like base body 36. The intermediate ring 97 determines the height and radial depth of the throttle ring groove 69. The entire set of components is then clamped together by tightening the threaded connection 81 on the fastening flange 79 of the retaining disk 49.

Spring elements 101, 103 are intended to damp the arrival of the shifting ring 45 in at least one end position, the goal being to minimize the noise which the ring would otherwise produce when making contact with the washers 83, 85. The spring elements 101, 103 are formed by spring washers, each of which has at least one cutout 105, 107, which is larger than the pilot cross section 59, 61 in the washers 83, 85.

Figure 17:
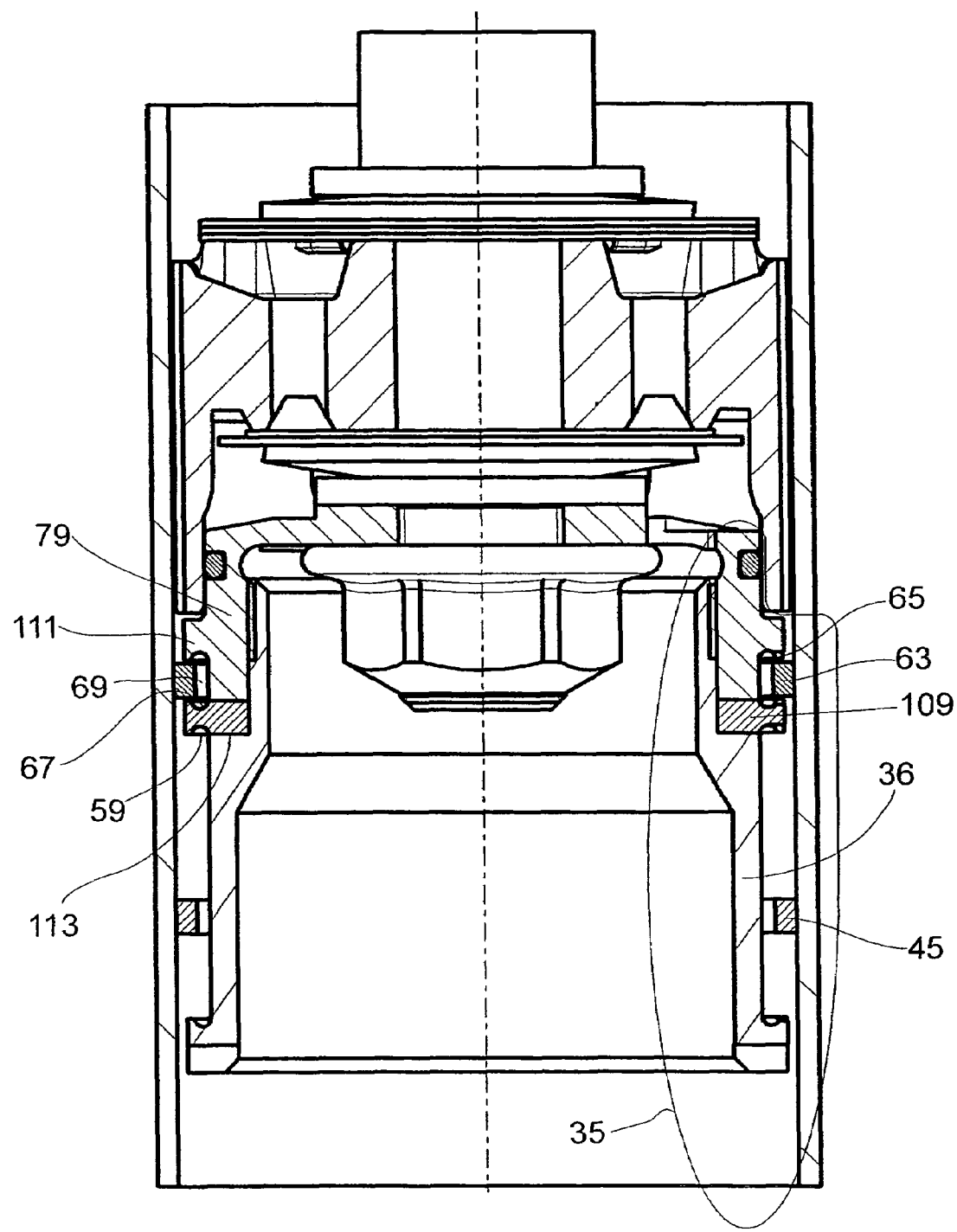

The design according to FIG. 17 is modified in comparison with that of FIG. 16 in that the function of the washers 83 and 89 and of the spacer disk 91 are combined in an intermediate ring 109. It is very easy to stamp the pilot cross sections 59, 67 into the intermediate ring. A shoulder 111 is provided on the fastening flange 79; this shoulder forms the radial and axial boundaries of the throttle ring groove 69, and the pilot cross section 65 is machined into it. The retaining disk has no undercuts and can therefore be very easily produced by injection-molding or by sintering. The intermediate ring 109 is supported against an end surface 113 of the sleeve-like base body. The intermediate ring is clamped between the fastening flange 79 of the retaining disk and the sleeve-like base body 36; the throttle ring 63 and the shifting ring 45 can be threaded onto the associated free ends before the base body 36 and the flange 79 are clamped together. The rings 45, 63 thus do not have to have slots to allow radial expansion. The entire unit 35 can be fabricated independently, separate from the piston as a whole.

Figure 18:
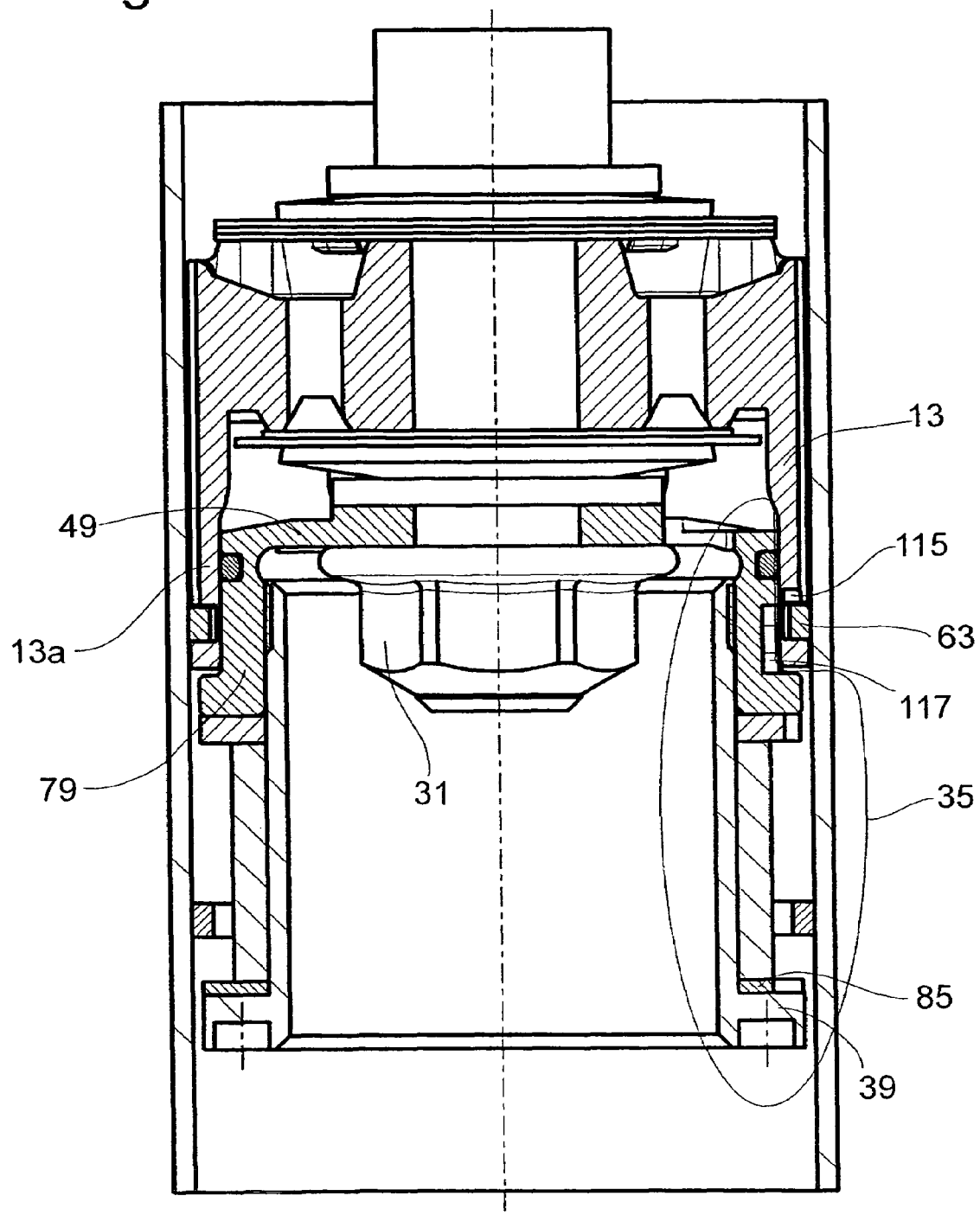
FIGS. 18 and 19 show adjustable pilot cross sections.
Figure 19:
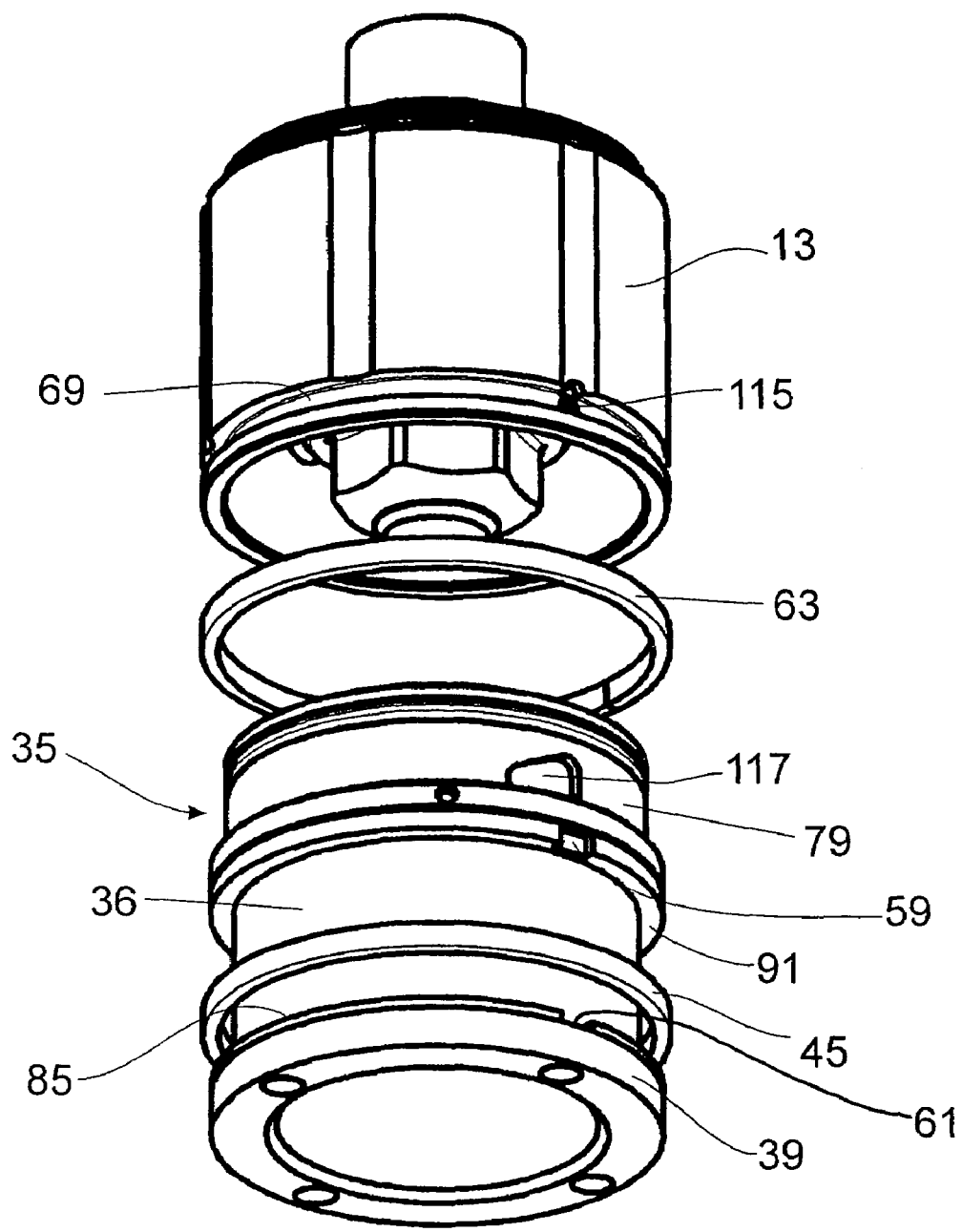

FIGS. 18 and 19 describe an embodiment of the invention in which the pilot cross section at the throttle ring 63 is adjustable. The pilot cross sections 65, 67 in the previously described variants are made with the same dimensions within the range of manufacturing tolerances. The pilot cross section according to FIGS. 18 and 19 is formed within the assembly 35 by two components, namely, the piston body 13 and the fastening flange 79, which are adjustable relative to each other. The fastening flange, as part of the retaining disk 49, can be rotated in the circumferential direction with respect to the piston body 13 after the piston nut 31 has been loosened. A control opening 115 with a connection to the throttle ring groove 69 is provided in the piston skirt 13a. A pocket 117 is formed in the fastening flange 79; this pocket can be brought into alignment with the control opening 115. Thus the fastening flange functions as a control slide, which, together with the control opening, determines the adjustable pilot cross section.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper with amplitude-selective damping force, the damper comprising:
   a cylinder containing a damping medium;
   a piston rod which is axially movable in said cylinder;
   a piston assembly arranged for axial movement in the damping medium, the piston assembly being connected to the piston rod and dividing the cylinder into a working space around the piston rod and a working space opposite the piston rod, the piston assembly comprising a piston body having connecting channels for opposite directions of flow between the working spaces, and valve disks which open the channels in respective said opposite directions;
   a flow connection between the working spaces;
   an axially movable throttle ring which determines at least one first pilot cross-section in the flow connection as a function of movement of the piston rod, and a pair of first stop surfaces which limit axial movement of the throttle ring; and
   a pilot assembly comprising an axially movable shifting ring which determines at least one second pilot cross-section in the flow connection as a function of movement of the piston rod, and a pair of second stop surfaces which limit axial movement of the shifting ring, wherein the second stop surfaces are independent of the piston body and the valve disks,
   wherein the at least one first pilot cross-section is larger than the at least one second pilot cross-section.

2. The vibration damper of claim 1 wherein the pilot assembly further comprises a tubular base body.

3. The vibration damper of claim 2 wherein the tubular base body comprises annular webs on which the second stop surfaces are provided.

4. The vibration damper of claim 1 wherein the pilot assembly is supported axially against the piston body.

5. The vibration damper of claim 2 further comprising a seal which seals the piston assembly against the tubular base body.

6. The vibration damper of claim 1 wherein the piston body has a lateral surface provided with an axial groove which forms part of the flow connection.

7. The vibration damper of claim 1 wherein the piston assembly comprises the throttle ring.

8. The vibration damper of claim 1 wherein the pilot assembly comprises the throttle ring.

9. The vibration damper of claim 1 wherein the throttle ring is axially movable within defined limits and defines two first pilot cross-sections as a function of the direction of movement of the throttle ring.

10. The vibration damper of claim 1 wherein the shifting ring is axially movable within defined limits and defines two second pilot cross-sections as a function of the direction of movement of the shifting ring.

11. The vibration damper of claim 1 wherein at least one of the first and second pilot cross-sections is formed by recesses in a respective at least one of the throttle ring and the shifting ring.

12. The vibration damper of claim 2 further comprising a retaining disk which holds the tubular base body in place on the piston rod.

13. The vibration damper of claim 12 wherein the retaining disk has a through opening for passage of damping medium.

14. The vibration damper of claim 12 wherein the retaining disk comprises a fastening flange for fixing to the tubular base body.

15. The vibration damper of claim 14 wherein the fastening flange is threaded on the tubular base body.

16. The vibration damper of claim 1 wherein the at least one first pilot cross-section is adjustable.

17. A vibration damper with amplitude-selective damping force, the damper comprising:
   a cylinder containing a damping medium;
   a piston rod which is axially movable in said cylinder;
   a piston assembly arranged for axial movement in the damping medium, the piston assembly being connected to the piston rod and dividing the cylinder into a working space around the piston rod and a working space opposite the piston rod, the piston assembly comprising a piston body having connecting channels for opposite directions of flow between the working spaces, and valve disks which open the channels in respective said opposite directions;
   a flow connection between the working spaces;

an axially movable throttle ring which determines at least one first pilot cross-section in the flow connection as a function of movement of the piston rod, and a pair of first stop surfaces which limit axial movement of the throttle ring; and a pilot assembly comprising an axially movable shifting ring which determines at least one second pilot cross-section in the flow connection as a function of movement of the piston rod, and a pair of second stop surfaces which limit axial movement of the shifting ring, wherein the second stop surfaces are independent of the piston body and the valve disks, wherein the at least one first pilot cross-section is formed by two components which can be adjusted relative to each other.

18. The vibration damper of claim 17 wherein one of said components is formed by the piston body and the other of said components is formed by the pilot assembly.

19. The vibration damper of claim 17 wherein one of said components is a ring groove and the other of said components is a control slide which can cover the ring groove.

20. The vibration damper of claim 19 wherein the control slide has a pocket which is connected to the flow connection.

21. The vibration damper of claim 17 wherein the pilot assembly further comprises a tubular base body.

22. The vibration damper of claim 21 wherein the tubular base body comprises annular webs on which the second stop surfaces are provided.

23. The vibration damper of claim 17 wherein the pilot assembly is supported axially against the piston body.

24. The vibration damper of claim 21 further comprising a seal which seals the piston assembly against the tubular base body.

25. The vibration damper of claim 17 wherein the piston body has a lateral surface provided with an axial groove which forms part of the flow connection.

26. The vibration damper of claim 17 wherein the piston assembly comprises the throttle ring.

27. The vibration damper of claim 17 wherein the pilot assembly comprises the throttle ring.

28. The vibration damper of claim 17 wherein the throttle ring is axially movable within defined limits and defines two first pilot cross-sections as a function of the direction of movement of the throttle ring.

29. The vibration damper of claim 17 wherein the shifting ring is axially movable within defined limits and defines two second pilot cross-sections as a function of the direction of movement of the shifting ring.

30. The vibration damper of claim 17 wherein at least one of the first and second pilot cross-sections is formed by recesses in a respective at least one of the throttle ring and the shifting ring.

31. The vibration damper of claim 21 further comprising a retaining disk which holds the tubular base body in place on the piston rod.

32. The vibration damper of claim 31 wherein the retaining disk has a through opening for passage of damping medium.

33. The vibration damper of claim 31 wherein the retaining disk comprises a fastening flange for fixing to the tubular base body.

34. The vibration damper of claim 33 wherein the fastening flange is threaded on the tubular base body.

35. The vibration damper of claim 17 wherein the at least one first pilot cross-section is adjustable.

* * * * *